United States Patent [19]
Ekwall

[11] 4,108,258
[45] Aug. 22, 1978

[54] ROCK DRILLING APPARATUS WITH NOISE REDUCING DRILL ROD COVER

[75] Inventor: Carl G. B. Ekwall, Saltsjobaden, Sweden

[73] Assignee: Atlas Copco Aktiebolag, Nacka, Sweden

[21] Appl. No.: 707,349

[22] Filed: Jul. 21, 1976

[51] Int. Cl.² .............................................. E21B 17/00
[52] U.S. Cl. ...................................... 175/320; 52/108;
173/DIG. 2; 175/103; 175/209; 181/230
[58] Field of Search ................. 175/209, 210, 211, 57,
175/103, 320; 52/108; 173/DIG. 2; 242/54 R;
181/36 A

[56] References Cited

U.S. PATENT DOCUMENTS

| | | | |
|---|---|---|---|
| 2,702,181 | 2/1955 | Brown et al. | 175/209 |
| 2,999,550 | 9/1961 | Gerentes | 173/147 X |
| 3,016,988 | 1/1962 | Browning | 52/108 X |
| 3,434,674 | 3/1969 | Groskopfs | 52/108 |
| 3,480,091 | 11/1969 | Gyongyosi | 173/160 |
| 3,608,844 | 9/1971 | Tumuity | 52/108 X |
| 3,788,423 | 1/1974 | Nittinger | 175/209 X |
| 3,805,462 | 4/1974 | Caperton | 52/108 |
| 4,018,397 | 4/1977 | Rüsch et al. | 52/108 X |

FOREIGN PATENT DOCUMENTS

| | | | |
|---|---|---|---|
| 1,225,839 | 9/1966 | Fed. Rep. of Germany | 52/108 |
| 1,189,492 | 3/1965 | Fed. Rep. of Germany | 175/57 |
| 549,240 | 10/1956 | Italy | 175/209 |

*Primary Examiner*—Ernest R. Purser
*Assistant Examiner*—William F. Pate, III
*Attorney, Agent, or Firm*—Flynn & Frishauf

[57] ABSTRACT

A rock drilling apparatus has a noise reducing drill rod cover which comprises a pair of elongated strips, each of which, when in an extended condition in the longitudinal direction thereof, form part-cylindrical members which matingly engage the other strip to form a generally cylindrical cover around the drill rod. Spool means is provided, preferably in the area of the centralizer, to selectively roll the elongated strips thereon, the strips being flattened when rolled onto the spool means. The elongated strips are rolled onto simultaneously driven spools, and comprise either metallic strips, metallic strips covered with rubber on one or both surfaces thereof, or elastic strips having spaced metallic inserts embedded therein.

63 Claims, 17 Drawing Figures

U.S. Patent  Aug. 22, 1978  Sheet 1 of 2  4,108,258
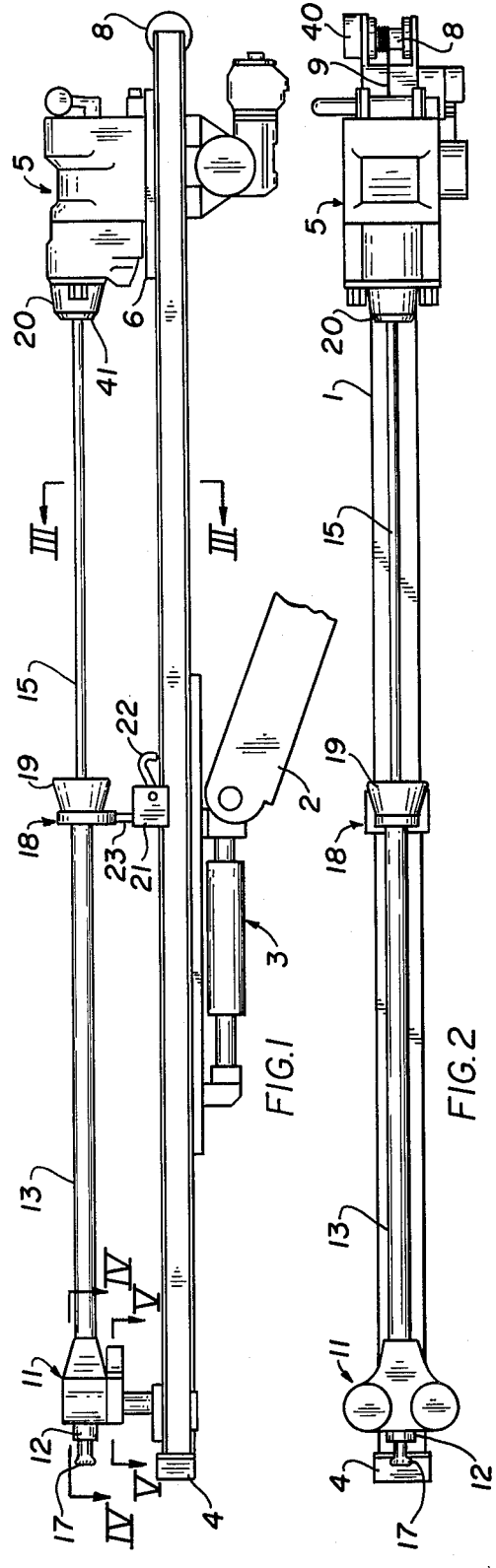
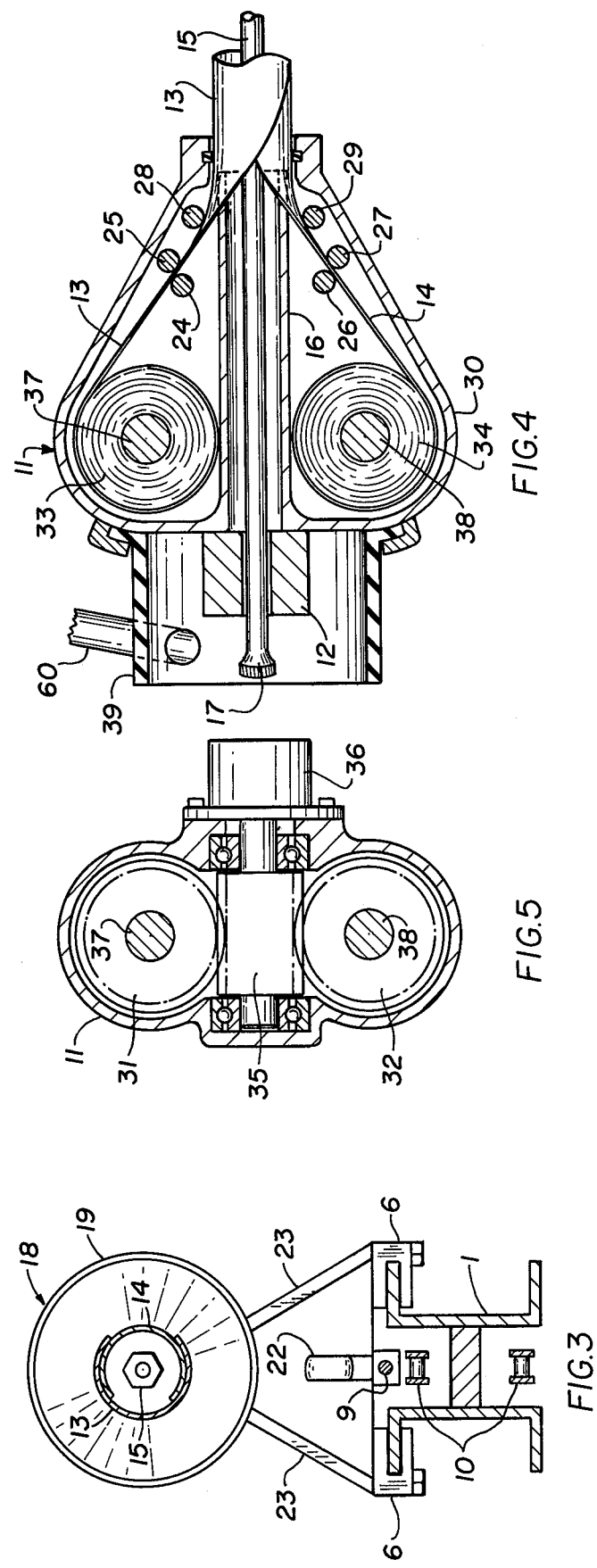

ROCK DRILLING APPARATUS WITH NOISE REDUCING DRILL ROD COVER

The present invention is directed to drilling machines, and more particularly to a drilling machine having a means for muffling the noise from the drill rod.

Modern rock drills, pneumatic as well as hydraulic, are less noisy than the drill rod. In fact, the modern rock drills can relatively easily be made still more silent, but there is no point in reducing the noise of the drill any further as long as the noise from the drill rod dominates.

Therefore, the object of the present invention is to provide a device for effectively muffling the noise of the drill rod, thereby substantially reducing the overall noise of the drilling apparatus.

SUMMARY OF THE INVENTION

According to the present invention, the means for muffling the drill rod noise in a rock drill comprises a pair of elongated strips, each of which, when in an extended condition, in the longitudinal direction thereof, form part-cylindrical members which matingly engage the other strip to form a generally cylindrical cover around the drill rod. Spool means is mounted to the apparatus for selectively rolling the elongated strips thereon to vary the length of the generally cylindrical cover, the elongated strips being flattened when rolled onto the spool means. Further provided is means connected to the ends of the strips for maintaining the cover around the drill rod. Preferably, the means at the ends of the strips is a docking means which attaches to the rock drill to cause the cylindrical cover to substantially completely enclose the portion of the drill rod between the rock drill and the centralizer at the end thereof.

In accordance with a feature of the invention, the strips are metallic and have an elastic covering on the outer or inner surface thereof. Another modification comprises strips formed of elastic material having spaced metallic strips embedded therein for causing the elastic elongated strips to form into said part-cylindrical members when unwound from said spool means.

Other features of the invention will become apparent from the description of the preferred embodiments and from the appended claims.

BRIEF DESCRIPTION OF THE DRAWINGS

FIG. 1 is a side elevational view of a drilling apparatus embodying the drill rod noise muffling device according to the present invention;

FIG. 2 is a top view of the apparatus of FIG. 1;

FIG. 3 is a cross-sectional view taken along the line III — III in FIG. 1;

FIG. 4 is a cross-sectional view taken along the line IV — IV in FIG. 1;

FIG. 5 is a cross-sectional view taken along the line V — V in FIG. 1;

DETAILED DESCRIPTION OF ILLUSTRATED EMBODIMENTS

Figure 6:
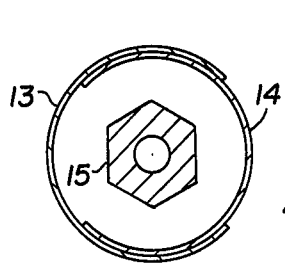
FIG. 6 shows a simple steel strip arrangement forming a drill rod cover in accordance with the present invention.

Referring to FIGS. 1–3, a drilling apparatus according to the present invention comprises a feed beam 1 mounted to a boom 2, the details of which are not shown. The feed beam 1 is axially slidably mounted to the boom 2 and axially movable by means of a feed beam extension cylinder 3 which is preferably hydraulically operated. The feed beam 1 has a feed beam support 4, preferably made of rubber, mounted at the forward end thereof. An impact rock drill 5, the operation of which is conventional, is mounted on a cradle 6 which is slidably mounted on the feed beam 1. An hydraulic feed motor 7 is provided for moving the rock drill 5 along the feed beam 1. A winch 8 is provided at the end of the feed beam 1 and drives a winch wire 9 (see FIGS. 2 and 3). The hydraulic feed motor 7 is operatively connected to a feed chain 10 (see FIG. 3), the feed chain 10 being connected to the drill slide or cradle 6 which is moved by the feed motor 7 via the chain 10.

At the forward end of the feed beam 1 is mounted an assembly 11 which houses a drill rod centralizer 12 and a special arrangement of extensible strips 13,14 which serve to muffle the noise from the drill rod 15. A pipe 16 is provided within the assembly 11 to protect the strips 13,14, and their associated driving mechanisms, from being contaminated with mud. The pipe 16 has a sufficiently large internal diameter to permit an integral drill bit 17 to pass therethrough.

A docking cone arrangement 18 is coupled to the free ends of the strips 13,14, as shown in FIGS. 1 and 2, and is slidably mounted to the feed beam 1. The docking cone arrangement includes a docking cone 19 which is tapered to engage over the front end 20 of the impact rock drill 5. The drill rod 15 passes through the central portion of the docking cone 19. The docking cone 19 is mounted to the feed beam 1 by means of a slide member 21 which is connected to the winch wire 9. The slide member 21 further includes a hook member 22 for locking the slide member 21 to the drill slide 6. The cone 19 is mounted to slide member 21 by means of supports 23.

Figure 15:
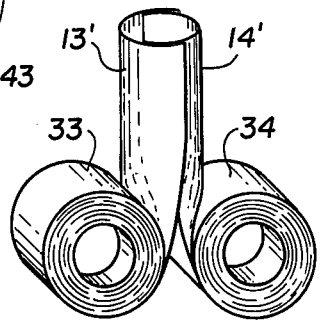
FIGS. 15 and 16 are simplified views of the extensible strips forming the drill rod cover.
Figure 16:
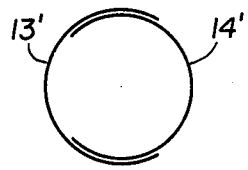

FIGS. 15 and 16 illustrate, in simplified form, the general arrangement and operation of the strips 13,14 shown in FIGS. 1–4. The strips 13',14' of FIGS. 15 and 16 are, in their retracted condition, rolled up in a flattened manner on respective rolls 33,34. The strips 13',14' are of such a nature that when unwound, they each form into curved segments of a cylinder, as shown in FIG. 16 and in the upper portion of FIG. 15. When retracted, each of the strips 13',14' are flattened and are conveniently stored in a compact spool which may be easily unwound to form an extended cylindrical member, as will be described in more detail hereinbelow, to effectively act as a muffling cylnder around the drill rod 15.

Referring to FIG. 4, the strips 13,14 are wound in spools 33,34 after passing through pairs of flattening rollers 24,25 and 26,27, respectively. Further rollers 28,29 are provided at the exit of the housing 30 to facilitate passages of the strips 13,14.

Referring to FIG. 5, respective worm gear wheels 31,32 are driven by a worm screw 35, which in turn is driven by a motor 36, which is preferably a hydraulic motor with planetary gearing coaxial with the worm screw so as to rotate the worm screw 35. The worm wheels have respective axes 37,38 which are rotatably driven by the worm wheels, the axes 37,38 being coupled to the ends of the strips 13,14 to selectively wind the strips 13,14 into spools 33,34.

Optionally provided, as shown in FIG. 4, is a rubber dust hood 39 which surrounds the drill rod centralizer 12 and the forward portion of assembly 11 and which is adapted to abut against a working surface. The dust hood 39 is coupled to a suction pipe 60 which is connected to a dust collector in a conventional manner. A dust collecting hood and an interconnection to a dust collector via a suction pipe is shown, for example, in British Pat. Specification No. 1,097,169, published Dec. 29, 1976.

OPERATION

In order to insert the drill steel (i.e., drill rod) 15, the hook 22 of the docking arrangement 18 is released so as to release the docking arrangement 18 from the drill slide 6. The winch motor is idled and the motor 36 of the end assembly is operated to pull the docking arrangement 18 to the left end position whereby it is adjacent the end assembly 11. During this operation, the strips 13,14 are wound onto spools 33,34, after being flattened by rollers 24,25 and 26,27, respectively. The centralizer 12 is then opened and the drill steel is inserted through the centralizer from the right and its shank is inserted into the drill 17 and held there by means of any conventional drill steel holder on the drill. The centralizer 12 is then closed. The winch 8, which is hydraulically operated by means of a motor 40, is then operated so as to winch the docking arrangement 18 to the right end position to bring the cone 19 onto the conical nose 20 of the rock drill 5. The winch operates against the force of the motor 36 in the end assembly 11 so that the strips 13,14 are maintained in a taut condition. Alternatively, the motor need not be applied. If the worm gear is self-locking, the motor 36 must instead be applied in the direction of extending the strips since the winch 8 will not otherwise be able to pull the strings outwardly. If the motor 36 operates the spools more slowly than the winch pulls the strips, the strips will still be held in a taut condition. Then, hook 22 is manually operated to lock the slide member 21 of docking assembly 18 to the drill slide 6. When a replaceable drill bit is used, the drill bit is screwed on after the drill rod has been inserted through the centralizer, since the drill bit generally has too large a diameter to pass through the pipe 16.

In order to carry out a drilling operation, the boom 2 and feed beam 1 are adjusted to locate the feed beam adjacent a working surface, as desired, and as is conventional. A typical boom arrangement which is suitable for use in the present invention is shown, for example, in U.S. Pat. No. 3,923,276, issued Dec. 2, 1975 and assigned to the same Assignee as the present application. Other drill boom arrangements could be used, as should be apparent to one ordinarily skilled in the art. The feed beam 1 is extended so as to take support against a rock surface with its end-mounted rubber pad 4 abutting against the rock surface. Drilling starts in a conventional manner and, during drilling, as the impact rock drill 5 moves to the left along feed beam 1, the strips 13,14 are wound onto the spools 33,34. When drilling is finished, the drill is returned to its initial position and, due to the hook 22, the docking arrangement 18 is also moved to the right, so that the strips 13,14 unwind from their respective spools 33,34 and form the generally cylindrical muffling cover for the drill rod 15. The feed beam is then positioned for drillng of another hole, as desired. After drillng a plurality of holes, for example six holes in many instances, the drill steel tip must be reground and the drill steel is therefore replaced.

When the motor 36 of the end assembly 11, which is used for driving the spools 33,34 for the strips 13,14, respectively, is reversible, and in a case where the strips 13,14 can take an axial compression load in order to push the docking arrangement 18, the winch is not necessary. Also, the hook 22 of docking arrangement 18 is not necessary in an arrangement where the docking arrangement 18 is biased against the drill 5 by the winch 8 during a drilling operation.

The nose of the impact rock drill 5 has a small outlet 41 for feeding compressed air into the docking cone 19 of docking arrangement 18 so that there will be a slight overpressure in the cover formed by strips 13,14 during drilling. This air blows out through the pipe 16 of the end assembly 11 and out through the centralizer 12 to prevent debris from getting into the pipes 16 and cover 13,14. Further, the overpressure in the cover 13,14 will make the cover, in its cylindrical form, more rigid since it will increase the friction forces between the two strips 13,14 forming the drill rod cover.

The embodiment of FIGS. 1–5 show strips 13,14, which are simple steel strips, as shown in an enlarged view in FIG. 6, which, when unwound, form mating part-cylindrical sections which cooperate to form a generally elongated cylindrical cover for the drill rod 15 to effectively muffle the drill rod noise. The strips 13,14 could be made of stainless steel, or any other suitable metal providing the characteristics so that it may be flattened when wound on respective spools, and formed into a generally cylindrical member when unrolled. The strips 13,14 could be made of other flexible materials and could be made advantageously of rubber composites as will be described hereinbelow.

Figure 7:
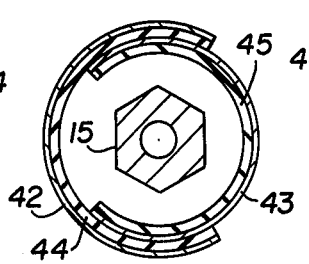
FIGS. 7 and 8 show drill rod covers similar to those of FIG. 6, but comprising steel strips having one side completely covered with rubber.

FIG. 7 shows a cover comprised of steel strips 42,43, one side of the respective strips 42,43 being covered by rubber layers 44,45 bound thereto. In FIG. 7, the rubber 44,45 is bound to the inner surfaces of the respective steel strips 42,43.

Figure 8:
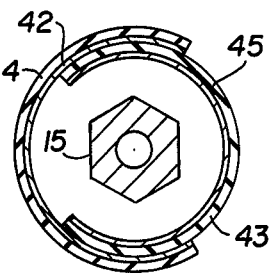

FIG. 8 is a construction similar to that of FIG. 7, but the rubber strips 44,45 are bound to the outer surfaces of respective steel strips 42,43.

Figure 9:
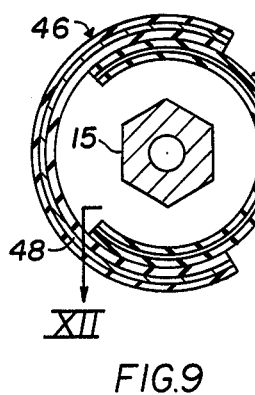
FIGS. 9 and 12 show drill rod covers having spaced spring steel inserts enclosed within the rubber.
Figure 12:
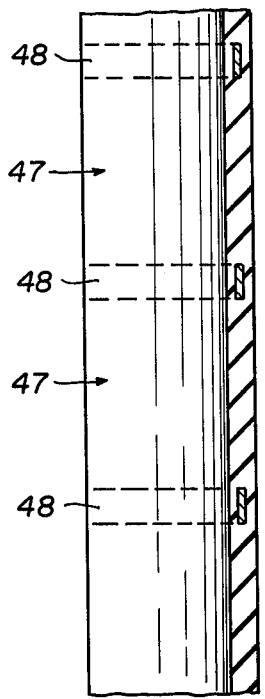

FIG. 9 shows a further modification of the present invention wherein the drill rod cover is formed of rubber strips 46,47, each of which has spaced spring steel inserts 48 enclosed within the rubber. FIG. 12 shows a cross-section of FIG. 9 and more clearly illustrates the spring metal strips 48 which are in the rubber 47, the spring metal strips 48 being made of stainless steel or any other suitable material.

Figure 11:
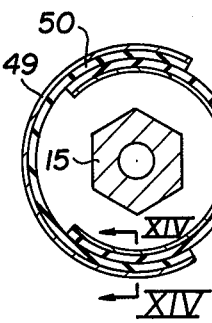
FIGS. 11 and 14 show still another modification of the drill rod covers according to the present invention.
Figure 14:
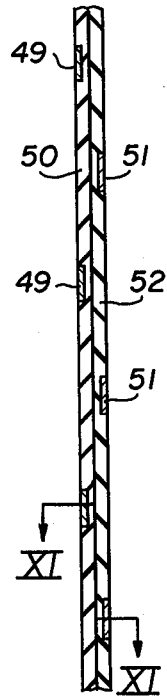

FIG. 11 illustrates another embodiment of the present invention wherein spaced spring steel inserts 49 are enclosed within rubber 50. The inner strip of the arrangement of FIG. 11 is also comprised of spaced spring steel inserts 51 within rubber 52, as shown in greater detail in the cross-sectional view illustrated in FIG. 14.

Figure 10:
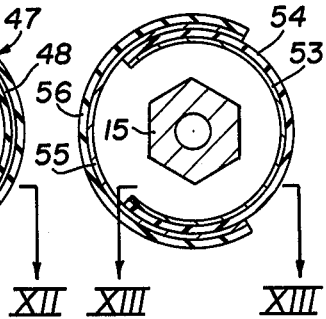
FIGS. 10 and 13 show modifications of the arrangement of FIGS. 9 and 12.
Figure 13:
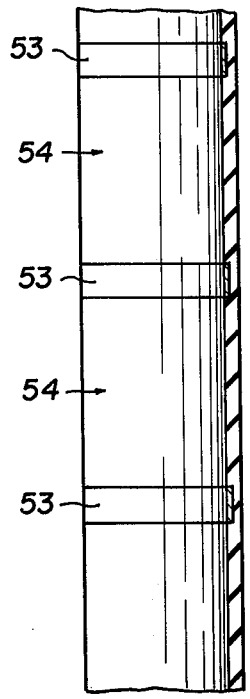

FIG. 10 shows a modification of FIG. 9 wherein spaced steel strips 53 is embedded in rubber 54 to form the inner strip of the drill rod cover and spaced steel strips 55 are embedded in the rubber strip 56 to form the outer strip of the drill rod cover. This arrangement is illustrated in greater detail in the cross-sectional view of FIG. 13. The outer strip in the arrangement of FIG. 10 is similar to the inner strip illustrated in FIG. 13.

The embodiments of FIGS. 9–14 will have an advantage in that the rubber strips will most likely be less sensitive to dirt than steel strips when wound into the coils 33,34. The rubber strips can be set under considerable tension during drilling so that they form a straight cover when extended, for example as shown in FIGS. 1 and 2. It will be of no harm that the rubber strips will stretch considerably when under tension. The rubber strips will provide a more effective seal against each other when formed into the elongated cylindrical configuration than the metal strips alone.

The rubber coverings on the strips as shown in FIGS. 7 and 8 will also improve the sealing characteristics of the strips when extended into the elongated cylindrical form. The rubber strips also provide more effective sound insulation than is obtained when using metallic strips alone.

Figure 17:
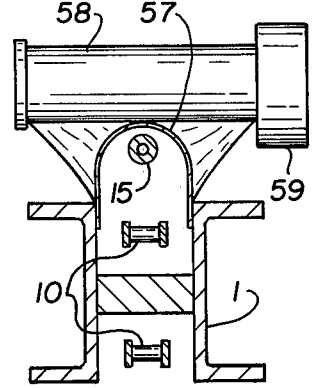
FIG. 17 shows still another modification of the drill rod covers according to the present invention.

FIG. 17 shows a modification in which there is a single strip 57. The strip 57 has a bow-formed cross section and it can be wound onto a single roller 58 which is driven by a motor 59. This figure is very schematic and the rollers for flattening the strip are not shown. The roller 58 can be mounted at the front end of the feed beam 10 as in FIGS. 1 and 2 and the distal end of the strip can be affixed to the docking arrangement 18, 21 as in these figures. The single strip 57 of FIG. 17 and the feed beam 1 form together a cylindrical cover for the drill rod 15.

While the invention has been described above with respect to specific embodiments, it should be clear that various alterations and modifications may be made thereto within the scope of the invention as defined in the appended claims.

As an example of a non-illustrated possible modification can be mentioned that the spools 31,32 and 58 respectively, can be mounted on the cradle 6 or on the drill 5 and that the extendable ends of the strips can be affixed to the winch driven slide 18. Then, the winch 8 should be arranged to pull the slide 18 forwardly along the feed beam instead of backwardly.

As another example can be mentioned that the spools 31,32 and 58 respectively, can be mounted on the slide 18.

Further, the strips need not necessarily be circular or bow-formed. They can be flat, and flat strips can be attached to each other at an angle to each other by zip fastening means.

I claim:

1. Rock drilling apparatus comprising:
    a feed beam having forward and rear ends;
    a rock drill slidably mounted on said feed beam for driving a drill rod in a path parallel to said beam;
    elongated strip means coupled between said forward end of the feed beam and said rock drill to form a tubular sound muffling cover extending around and along said drill rod to muffle the noise of said drill rod;
    spool means for selectively rolling said elongated strip means thereon to vary the length of said muffling cover to adapt it to the variable distance between said forward end of the feed beam and said drill; and
    an assembly mounted on the front end of the feed beam forward of the forward end of said elongated strip means, said assembly including a drill rod centralizer and a dust collecting hood having an open front end adapted to contact the working surface of the rock to be drilled and a suction outlet, said muffling cover cooperating with said assembly to completely cover the drill rod from said working face of the rock to said rock drill.

2. Rock drilling apparatus according to claim 1 comprising drive means for driving said spool means to wind said strip means thereon.

3. Rock drilling apparatus according to claim 1 wherein said strip means comprises a pair of elongated strips and said spool means comprises a pair of spools for respectively winding said pair of strips thereon.

4. Rock drilling apparatus according to claim 3 comprising drive means for driving said pair of spools to wind said strips thereon.

5. Rock drilling apparatus according to claim 4 wherein said pair of spools each comprise a worm wheel coupled thereto, and wherein said drive means comprises a worm screw simultaneously engaging said worm wheels to simultaneously rotate said spools to wind said strips thereon, and motor means coupled to said worm screw for rotating said worm screw.

6. Rock drilling apparatus according to claim 1 further comprising docking means coupled to the ends of said strip means opposite to said spool means and for coupling said strip means to said rock drill, thereby substantially completely enclosing the portion of said drill rod between said centralizer and said rock drill, said docking means comprising means slidable on said feed beam and means for selectively locking said slidable means to said rock drill.

7. Rock drilling apparatus according to claim 6 wherein said docking means comprises a docking cone engageable with a forward end of said rock drill to provide a substantial seal therebetween.

8. Rock drilling apparatus according to claim 7 comprising means for feeding compressed air into said cover formed of said extended strips to create an overpressure in said cover.

9. Rock drilling apparatus according to claim 8 wherein said means for feeding compressed air comprises aperture means on said rock drill and in communication with said docking cone for supplying compressed air to said cover through said docking cone.

10. Apparatus according to claim 6 comprising means for moving said docking means along said feed beam from said centralizer to said rock drill.

11. Rock drilling apparatus according to claim 10 comprising drive means coupled to said spool means to wind said strips thereon, said drive means being activated even when said docking means is moved from said centralizer to said rock drill to extend said strips to form said cover.

12. Rock drilling apparatus according to claim 1 comprising pipe means adjacent said spool means through which said drill rod passes for preventing contamination from getting into said spool means.

13. Rock drilling apparatus according to claim 12 wherein said spool means comprises a pair of spools mounted on opposite sides of said pipe means.

14. Rock drilling apparatus according to claim 13 wherein said spool means comprises a pair of spools and respective worm gear wheels coupled to said spools, and wherein said drive means comprises a worm screw coupled to said worm gears for simultaneously driving said worm gears in relative opposite directions, and therefore simultaneously driving said spools to wind said strips thereon, and means coupled to said worm screw for rotating said worm screw.

15. Rock drilling apparatus according to claim 14 further comprising roller means adjacent said spools for flattening said strips prior to their being wound on said spools.

16. Rock drilling apparatus according to claim 3 further comprising roller means adjacent said spools for flattening said strips prior to their being wound on said spools.

17. Rock drilling apparatus according to claim 1 wherein said elongated strips are metal strips.

18. Rock drilling apparatus according to claim 17 wherein said metal strips have elastic coverings thereon.

19. Rock drilling apparatus according to claim 18 wherein said elastic coverings are on the inner surfaces of said metal strips.

20. Rock drilling apparatus according to claim 18 wherein said elastic coverings are on the outer surfaces of said strips.

21. Rock drilling apparatus according to claim 17 wherein at least one of said metal strips have an elastic covering thereon.

22. Rock drilling apparatus according to claim 1 wherein said strips comprise elongated elastic strips having spaced metallic stiffening elements.

23. Rock drilling apparatus according to claim 22 wherein said spaced metallic inserts are located adjacent the inner surface of said strips.

24. Rock drilling apparatus according to claim 22 wherein said spaced metallic strips are located adjacent the outer surface of said strips.

25. Rock drilling apparatus according to claim 22 wherein said spaced metallic strips are embedded in the central portion of said elastic strips.

26. Rock drilling apparatus according to claim 1 wherein said strips are of a flexible elastic-like material and comprise curved, but flattenable, spaced stiffening elements to cause said strips to take part-cylindrical shapes when they are unwound from said spool means.

27. Rock drilling apparatus according to claim 26 comprising means for maintaining the unwound portions of said strips under tension.

28. Rock drilling apparatus according to claim 27 wherein said tension means comprise means for continuously applying rotational forces to said spool means in a direction to wind said strips on said spool means.

29. Rock drilling apparatus according to claim 1 wherein said strip means comprises two elastic strips, and comprising means for maintaining the unwound portions of said strips under tension.

30. Rock drilling apparatus according to claim 29 wherein said tension means comprises means for continuously applying rotational forces to said spool means in a direction to wind said strips on said spool means.

31. In a rock drilling apparatus comprising a feed beam having forward and rear ends; a rock drill slidably mounted on said feed beam for driving a drill rod; and a drill rod centralizer mounted on the forward end of said feed beam,
the improvement comprising extensible cover means for covering the drill rod for muffling the sound of said drill rod, said cover means including a pair of elongated strips which, when in an extended condition in the longitudinal direction thereof, form part-cylindrical members which partially overlap each other to form a generally cylindrical cover around said drill rod; and
means for supplying compressed air to said generally straight cover to provide a slight overpressure therein.

32. In a rock drilling apparatus comprising a feed beam having forward and rear ends; a rock drill slidably mounted on said feed beam for driving a drill rod; and a drill rod centralizer mounted on the forward end of said feed beam,
the improvement comprising extensible covering means formed of a pair of elongated part-cylindrical members which matingly engage each other to form a generally cylindrical cover around said drill rod for muffling the sound of said drill rod, said elongated strips being fabricated of a flexible elastomeric material; and
means for applying tension to said flexible elastomeric material constantly during drilling to maintain said flexible strips, and therefore said cover, generally straight around said drill rod during drilling.

33. Rock drilling apparatus according to claim 32 wherein said flexible elastomeric strips comprise spaced metallic stiffening elements.

34. Apparatus for forming an elongated generally cylindrical member, comprising:
a pair of elongated strips, each of which when in an extended condition in the longitudinal direction thereof, form part-cylindrical members which matingly engage with each other to form a generally cylindrical member, said strips being fabricated of elastic material with spaced metallic inserts in said elastic material;
spool means for selectively rolling said elongated strips thereon to vary the length of said generally cylindrical member, said elongated strips being flattened when rolled onto said spool means, said spool means comprising a pair of spools onto which said elongated strips are respectively rolled, a pair of worm gear wheels respectively coupled to said spools for rotating said spools, and a worm screw commonly coupled to said worm wheels for simultaneously rotating said worm wheels in relative opposite directions; and
means for maintaining the portion of said strips formed in said generally cylindrical member under tension to keep said generally cylindrical member straight.

35. In a rock drilling apparatus comprising a feed beam having forward and rear ends; a rock drill slidably mounted on said feed beam for driving a drill rod in a path parallel to said beam,
the improvement comprising
elongated strip means which, when in an extended condition, forms a screen extending along said drill rod between said forward end of the feed beam and said rock drill to muffle the noise of said drill rod, and
spool means transverse to said feed beam for selectively rolling said elongated strip means thereon to vary the length of said muffling screen to adapt it to the variable distance between said forward end of the feed beam and said drill, said strip means comprising a single strip having bow formed cross-section to form an elongated hood for said drill rod, said single strip being flattened when rolled onto said spool means.

36. In a rock drilling apparatus comprising a feed beam having forward and rear ends, a rock drill slidably mounted on said feed beam for driving a drill rod; and a drill rod centralizer mounted on the forward end of said feed beam,
the improvement comprising extensible tubular means around said drill rod and coupled between the drill and the forward end of the feed beam for muffling the sound of said drill rod, and means for blowing air forwardly through said extensible tubular means and out through said centralizer to prevent debris from getting into said extensible tubular means.

37. Rock drilling apparatus according to claim 1 wherein said cover ends adjacent said drill rod centralizer which is mounted on the front end of the feed beam, a clearance being provided between the drill rod and said centralizer to form an air outlet from said muffling cover; and further comprising means for effecting an air flow forwardly through said clearance to prevent debris from getting into said muffling cover.

38. Rock drill apparatus according to claim 1 comprising a clearance around the drill rod which forms an outlet from said muffling cover to said dust collecting hood.

39. Rock drilling apparatus according to claim 38 wherein said outlet from said muffling cover to said dust collecting hood comprises a clearance between the drill rod and the drill rod centralizer.

40. Rock drilling apparatus according to claim 1 comprising means for supplying air to the rear end of said muffling cover to effect a forwardly directed air flow therethrough and out through the front end of the cover to prevent debris from getting into the cover.

41. Rock drillng apparatus according to claim 1 wherein said drill rod centralizer is located within the dust collecting hood.

42. In a rock drilling apparatus comprising a feed beam having forward and rear ends; a rock drill slidably mounted on said feed beam for driving a drill rod in a path parallel to said beam,
the improvement comprising
elongated strip means which, when in an extended condition, forms a screen extending along said drill rod between said forward end of the feed beam and said rock drill to muffle the noise of said drill rod, and
spool means transverse to said feed beam for selectively rolling said elongated strip means thereon to vary the length of said muffling screen to adapt it to the variable distance between said forward end of the feed beam and said drill,
said strip means matingly engaging with said feed beam to form a tubular cover for said drill rod together with said feed beam.

43. In a rock drilling apparatus comprising a feed beam having forward and rear ends; a rock drill slidably mounted on said feed beam for driving a drill rod in a path parallel to said beam,
the improvement comprising
elongated strip means which, when in an extended condition, forms a screen extending along said drill rod between said forward end of the feed beam and said rock drill to muffle the noise of said drill rod, and
spool means transverse to said feed beam for selectively rolling said elongated strip means thereon to vary the length of said muffling screen to adapt it to the variable distance between said forward end of the feed beam and said drill,
said strip means and said feed beam together forming a tubular enclosure for said drill rod.

44. Rock drilling apparatus comprising:
a feed beam having forward and rear ends;
a rock drill slidably mounted on said feed beam for driving a drill rod in a path parallel to said beam;
elongated strip means coupled between said forward end of the feed beam and said rock drill to form a tubular sound muffling cover extending around and along said drill rod to muffle the noise of said drill rod;
spool means for selectively rolling said elongated strip means thereon to vary the length of said muffling cover to adapt it to the variable distance between said forward end of the feed beam and said drill;
a drill rod centralizer mounted on the front end of the feed beam;
said cover ending adjacent said drill rod centralizer and a clearance being provided between the drill rod and said centralizer to form an air outlet from said muffling cover; and
means for effecting an air flow forwardly through said clearance to prevent debris from getting into said muffling cover.

45. Rock drilling apparatus according to claim 44 further comprising a dust collecting hood at the front end of the feed beam, said drill rod centralizer being located within said dust collecting hood.

46. Rock drilling apparatus comprising:
a feed beam having forward and rear ends;
a rock drill slidably mounted on said feed beam for driving a drill rod in a path parallel to said beam;
elongated strip means coupled between said forward end of the feed beam and said rock drill to form a tubular sound muffling cover extending around and along said drill rod to muffle the noise of said drill rod;
spool means for selectively rolling said elongated strip means thereon to vary the length of said muffling cover to adapt it to the variable distance between said forward end of the feed beam and said drill; and
means for supplying air to the rear end of said muffling cover to effect a forwardly directed air flow therethrough and out through the front end of said muffling cover to prevent debris from getting into said muffling cover.

47. In a rock drilling apparatus comprising a feed beam having forward and rear ends; a rock drill slidably mounted on said feed beam for driving a drill rod; and a drill centralizer mounted on the forward end of said feed beam,
the improvement comprising extensible cover means for covering the drill rod for muffling the sound of said drill rod, said cover means comprising:
a pair of elongated strips, each of which, when in an extended condition in the longitudinal direction thereof, form part-cylindrical members which partially overlap each other to form a generally cylindrical cover around said drill rod;

spool means mounted to said feed beam for selectively rolling said elongated strips thereon to vary the length of said generally cylindrical cover, said elongated strips being flattened when rolled onto said spool means;

pipe means adjacent said spool means through which said drill rod passes for preventing contamination from getting into said spool means; and docking means connected to the ends of said strips opposite said spool means and attachable to said rock drill to substantially completely enclose the portion of said drill rod between said centralizer and rock drill with said generally cylindrical cover which is formed by said extended portions of said strips to effectively muffle the noise of said drill rod.

48. Rock drilling apparatus according to claim 47 wherein said spool means comprises a pair of spools mounted on opposite sides of said pipe means.

49. Rock drilling apparatus according to claim 48 wherein said spool means comprises a pair of spools and respective worm gear wheels coupled to said spools, and wherein said drive means comprises a worm screw coupled to said worm gears for simultaneously driving said worm gears in relative opposite directions, and therefore simultaneously driving said spools to wind said strips thereon, and means coupled to said worm screw for rotating said worm screw.

50. Rock drilling apparatus according to claim 49 further comprising roller means adjacent said spools for flattening said strips prior to their being wound on said spools.

51. In a rock drilling apparatus comprising a feed beam having forward and rear ends; a rock drill slidably mounted on said feed beam for driving a drill rod; and a drill centralizer mounted on the forward end of said feed beam, the improvement comprising extensible cover means for covering the drill rod for muffling the sound of said drill rod, said cover means comprising:

a pair of elongated strips, each of which, when in an extended condition in the longitudinal direction thereof, form part-cylindrical members which partially overlap each other to form a generally cylindrical cover around said drill rod, said strips each being elastic strips with spaced metallic stiffening elements;

spool means mounted to said feed beam for selectively rolling said elongated strips thereon to vary the length of said generally cylindrical cover, said elongated strips being flattened when rolled onto said spool means; and docking means connected to the ends of said strips opposite said spool means and attachable to said rock drill to substantially completely enclose the portion of said drill rod between said centralizer and rock drill with said generally cylindrical cover which is formed by said extended portions of said strips to effectively muffle the noise of said drill rod.

52. Rock drilling apparatus according to claim 51 wherein said spaced metallic stiffening elements are located adjacent the inner surface of said strips.

53. Rock drilling apparatus according to claim 51 wherein said spaced metallic stiffening elements are located adjacent the outer surface of said strips.

54. Rock drilling apparatus according to claim 51 wherein said spaced metallic stiffening elements are embedded in the central portion of said elastic strips.

55. Rock drilling apparatus according to claim 51 wherein said metallic stiffening elements are embedded in said elastic material of said strips.

56. In a rock drilling apparatus comprising a feed beam having forward and rear ends; a rock drill slidably mounted on said feed beam for driving a drill rod; and a drill centralizer mounted on the forward end of said feed beam, the improvement comprising extensible cover means for covering the drill rod for muffling the sound of said drill rod, said cover means comprising:

a pair of elongated strips, each of which, when in an extended condition in the longitudinal direction thereof, form part-cylindrical members which partially overlap each other to form a generally cylindrical cover around said drill rod;

spool means mounted to said feed beam for selectively rolling said elongated strips thereon to vary the length of said generally cylindrical cover, said elongated strips being flattened when rolled onto said spool means;

said strips being of a flexible elastic-like material and comprise curved, but flattenable, spaced stiffening elements to cause said strips to take part-cylindrical shapes when they are unwound from said spool means; and docking means connected to the ends of said strips opposite said spool means and attachable to said rock drill to substantially completely enclose the portion of said drill rod between said centralizer and rock drill with said generally cylindrical cover which is formed by said extended portions of said strips to effectively muffle the noise of said drill rod.

57. Rock drilling apparatus according to claim 56 comprising means for maintaining the unwound portions of said strips under tension.

58. Rock drilling apparatus according to claim 57 wherein said tension means comprises means for continuously applying rotational forces to said spool means in a direction to wind said strips on said spool means.

59. Rock drilling apparatus according to claim 56 wherein said stiffening elements are metallic elements.

60. Rock drilling apparatus according to claim 56 wherein said stiffening elements are embedded in said elastic-like material of said strips.

61. Rock drilling apparatus according to claim 22 wherein said metallic stiffening elements are embedded in said elastic material of said strips.

62. Rock drilling apparatus according to claim 26 wherein said stiffening elements are metallic elements.

63. Rock drilling apparatus according to claim 26 wherein said stiffening elements are embedded in said elastic-like material of said strips.

* * * * *